June 5, 1962 R. L. TRAVIS 3,037,791
DRAWBAR ATTACHED TRACTION BOOSTER FOR TOWING VEHICLES
Filed Feb. 24, 1961 2 Sheets-Sheet 2
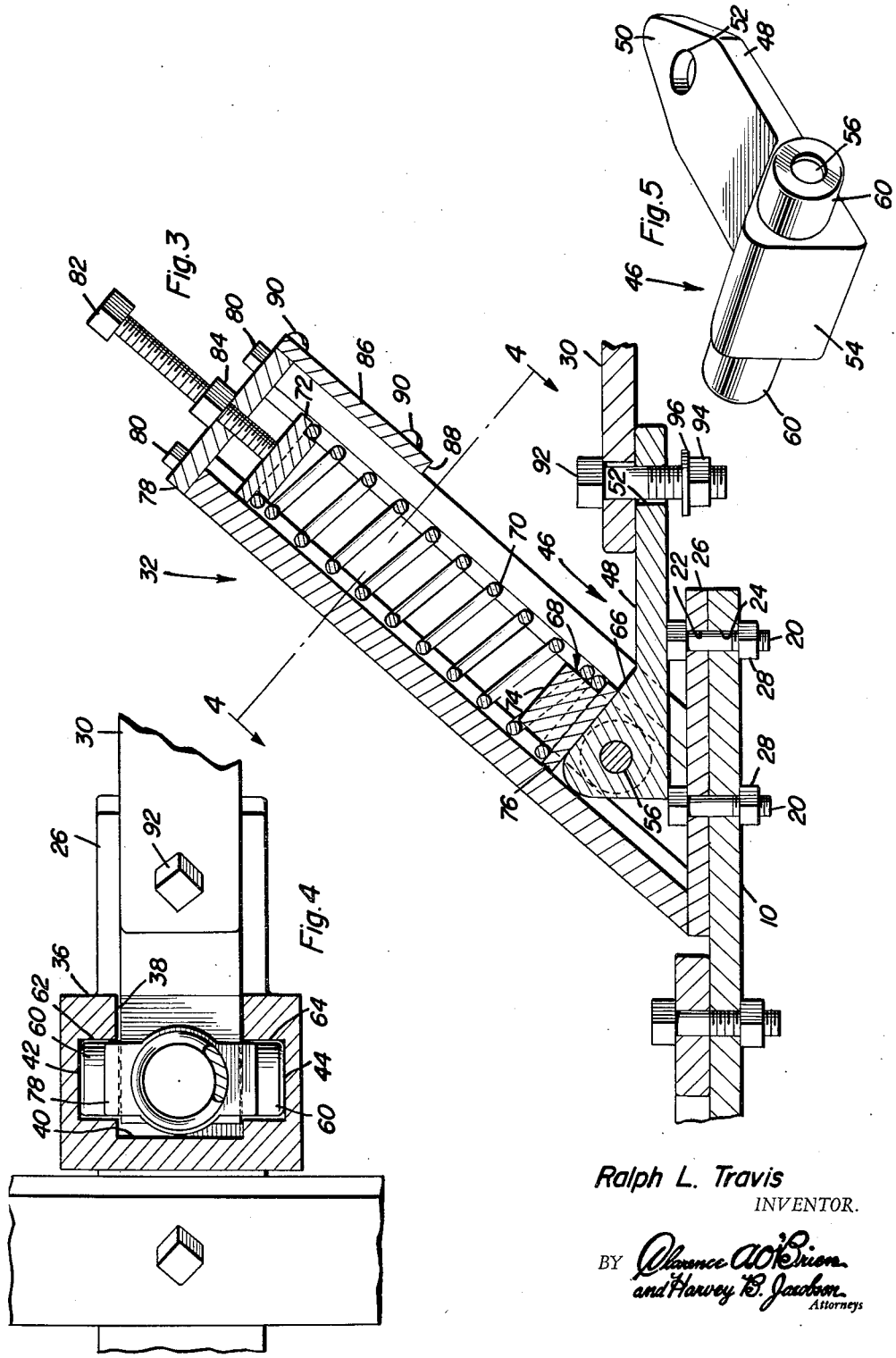
Ralph L. Travis
INVENTOR.

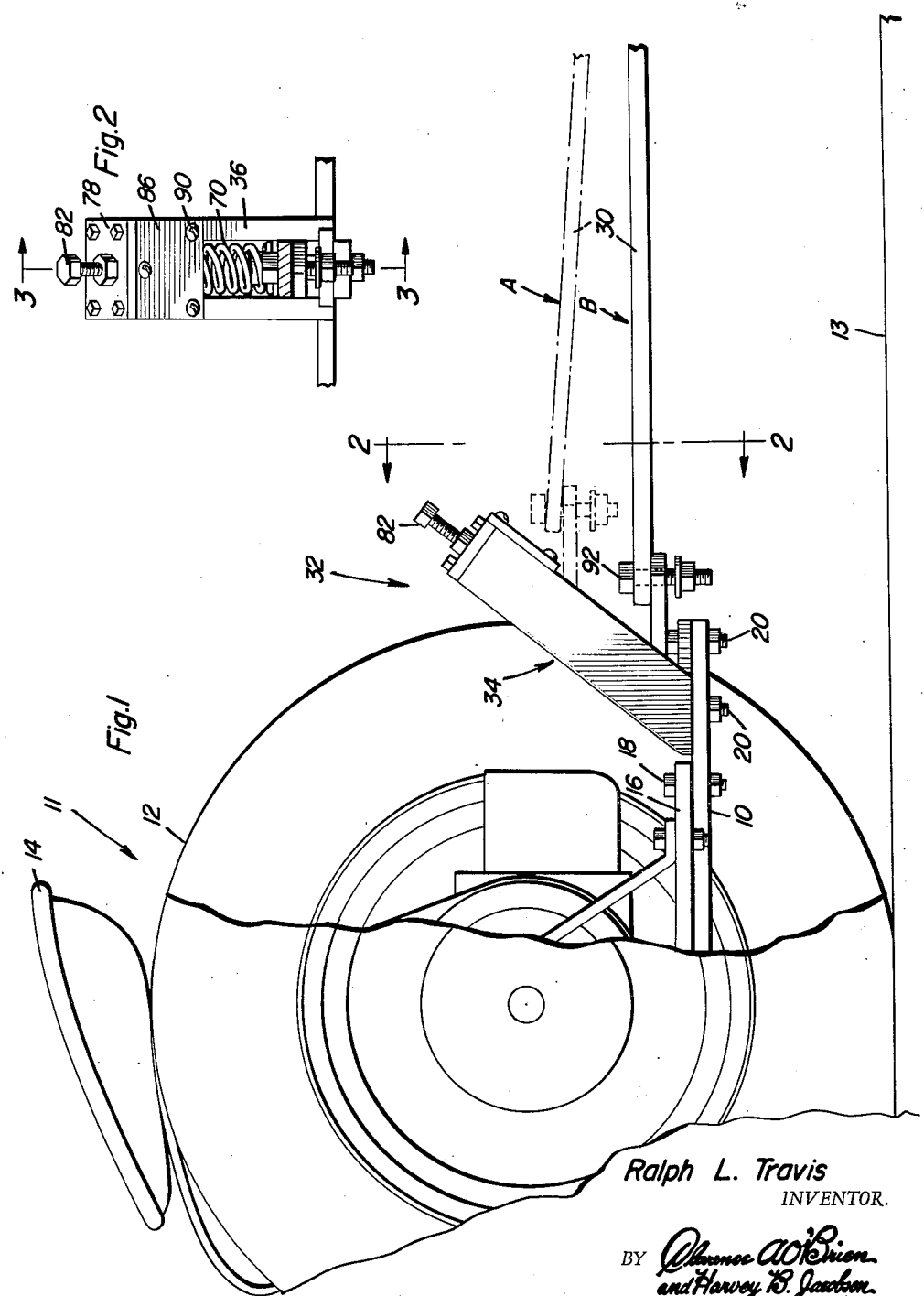

United States Patent Office 3,037,791
Patented June 5, 1962

3,037,791
DRAWBAR ATTACHED TRACTION BOOSTER
FOR TOWING VEHICLES
Ralph L. Travis, Sidney, Iowa
Filed Feb. 24, 1961, Ser. No. 91,400
3 Claims. (Cl. 280—405)

This invention relates to devices for increasing the traction of towing vehicles, and more particularly, to a mechanism for causing a downward pressure on the driving wheels of a towing or pushing vehicle whereby the wheels are forced with greater pressure into contact with the ground surface.

Briefly, the invention comprises an inclined plane mounted on one end of a propelling vehicle so as to form part of a force transmitting means for towing or pushing another vehicle. A roller means also forms part of the force transmitting means and rides upon the inclined surface in such a manner that when the tensile or compressive forces exerted through the towing mechanism are increased, the roller means rides upwardly upon the inclined surface so as to force it and the propelling wheels of the towing vehicle downwardly into firmer contact with the earth so as to prevent slippage.

Accordingly, an object of this invention is to provide a force transmitting means between two vehicles whereby the propelling vehicle has its driving wheels forced downwardly by the towing means for firmer engagement with the earth or road surface.

It is another object of my invention to provide a towing device for trailers or implements and the like which incorporate automatic resilient shock absorbing means.

It is still another object of this invention to provide a towing coupling having a spring shock absorber and so designed that only a fraction of the towing force is applied directly to the spring whereby a small spring may be used and the life thereof is increased.

It is yet another object of the invention to provide a towing coupling particularly adapted for tractors so as to prevent the tractor from needing the heavy wheel weights for the rear wheels, also in many cases this automatic drawbar attached traction booster will eliminate the fluid used in rear tires to add more weight on the rear wheels. It is my intention to provide a device that will eliminate the heavy weights for the rear wheels, also to eliminate the fluid in the rear tires of a tractor. However, in some cases it may be necessary to put a small weight on the front end of the tractor, to make it steer better, and to hold the front wheels down securely on the ground.

It is yet another object of this invention to provide a towing device having a spring means therein which may be manually adjusted for various loads and tensions.

Still another object of my invention is to provide a towing device as described above and which is simple in design and has only two relatively moving parts whereby the device is economical to manufacture, is durable in use and requires a minimum of maintenance.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of my invention shown mounted on the rear portion of a tractor;

FIGURE 2 is a rear elevational view of my invention;

FIGURE 3 is an enlarged cross sectional view taken substantially on the plane of lines 3—3 in FIGURE 2;

FIGURE 4 is a cross sectional view taken substantially on the plane of line 4—4 of FIGURE 3; and FIGURE 5 is a perspective view of one part of my invention.

FIGURE 1 shows a tractor having my novel device mounted on the drawbar 10 thereof. The tractor includes rear driving wheels 12, a seat 14, and a rear frame portion 16. The drawbar 10 is secured to the frame 16 by means of bolts 18. The drawbar 10 is of a conventional design and has two vertical bores in its rear portion which receive bolts 20 which extend through vertically aligned bores 24 and 22 in the drawbar 10 and base 26 respectively of my invention. Nuts 28 threaded on the bolts 26 securely hold the members 24 and 26 rigidly together.

Normally, when the tractor is used for towing or pulling an implement or another vehicle, the hitching tongue 30 thereof is secured directly to the end of the drawbar 10. However, by inserting my novel tractor booster 32 between the drawbar 10 and hitching tongue 30, the traction produced by the wheels 12 is greatly improved in a manner explained below.

The booster 32 comprises a generally rectangular housing 34 rigidly secured by conventional means such as welding to the base 26. The lower end of the housing 34 is canted or slanted in relation to the longitudinal axis thereof so that the housing forms an acute angle with the base 26.

The rear face 36 of the housing has a deep rectangular groove 38 extending to the inner face of the back wall 40 and along the entire length of the housing. Each side wall of the groove 38 has longitudinal channels 42 and 44 formed therein.

As shown in FIGURE 5, a part of my invention comprises a tongue assembly 46. This tongue assembly comprises a tongue 48 consisting of a rectangular plate tapered at its rear end 50 and containing a vertical aperture 52 therein. The forward end of the tongue is integrally connected to an enlarged head 54 which is generally triangular in side view, and the sides thereof have the ends of a pin 56 projecting therebeyond. The pin 56 has a tight friction fit with the bore within the head 54 as shown in FIGURE 3. Rotatably mounted on the ends of the pin 56 are two identical annular bearing members 60. The bearing members 60 may be plain or of the roller or ball bearing type.

As shown in FIGURES 3 and 4, the bearing members 60 fit slidably within the longitudinal channels 42 and 44. The rear surfaces 62 and 64 of the channels 42 and 44 are preferably highly finished and hardened to form cam surfaces for operative engagement with the rollers 60. The tongue 48 extends horizontally through the groove 38 and the rear upper surface of the head 54 has a bearing surface 66 which is substantially perpendicular to the longitudinal axis of the housing 34.

The groove 38 of the housing also contains a thrust member 68, a spring and an abutment member 72. The thrust member 68 has a circular projection 74 extending upwardly into the lower end of the circular coil spring and a radial flange 76 at its lower end for receiving the thrust of the spring. The flange 76 also has rectangularly extending wing portions 78 on diametrically opposite sides thereof which are guided within the channels 42 and 44. The abutment member 72 is of the same general shape as the thrust member 68 except that it is substantially thinner in cross section.

The upper end of the housing 34 is closed by a rectangular cap 78 removably secured to the housing by means of four threaded studs 80. Also, threaded into the central portion of the cap 78 is an elongated adjusting stud 82 whose lower end contacts the abutment 72 for adjusting the position and compression of the spring 70. A lock nut 84 is provided on the adjusting stud 82.

The upper portion of the groove 38 is enclosed by an abutment plate 86 having an abutment surface 88, and which is secured to the housing 34 by means of three screws 90.

In operation, the hitching tongue 30 is connected to the tongue 48 by means of a conventional pin or bolt 92 which may have a nut 94 and washer 96 attached to its lower end.

Normally, the spring 70 urges the thrust member 68 against the bearing surface 66 so as to maintain the tongue 48 in engagement with the base 26. However, when the tractor 11 is operated to tow the implement or vehicle connected to the hitching tongue, the roller 68 is urged by the tension in the tongue assembly 46 into firm engagement with the cam surfaces 62 and 64 within the housing.

Due to the slope of the cammed surfaces 62 and 64, the rollers begin to roll upwardly thereon and further compress the spring 76 as shown in FIGURE 3. As the tension in the members 30 and 46 are further increased by the pull of the tractor 11, the member 30 continues to move upwardly due to the upward movement of the roller 60 on the cam surfaces, and the tongue assembly may assume the dotted line position shown in FIGURE 1. In the dotted line or A position of the hitching tongue 30, the tongue approaches a position wherein it is merely nearly perpendicular to the cammed surfaces 62 and 64 and thereby a component of the pulling force in the hitching tongue 30 and tongue 48 is directed vertically downward thereby pulling the wheels 12 of the tractor 11 in a downward direction for a more firm grip with the earth or road surface. Also, a portion of the tensile force in the hitching tongue 30 when in the A position acts in an upward rearward direction for compressing the spring 70. The ratio of the forces acting on the spring and on the cam surfaces may be varied by changing the angle of slope of the cam surfaces or by changing the length of the hitching tongue 30. Also, the distance which the assembly 46 will move upwardly may also be regulated by the adjusting bolt 82 which varies the compression in spring 70. Alternatively if the cantilevered tongue A is fixed at its rearward end to a towed vehicle or implement so as to resist upward movement, its upward movement at 92 will be limited since the weight of the entire forward portion of the towed vehicle or implement will be exerting a downward force on tongue 48 and the rear wheels of the tractor 11. Adjusting nut 82 also provides a means for adjusting the spring 70 to handle various degrees of loads.

When the tongue assembly 46 moves upwardly in operation under extreme loads the bearing surface 66 strikes the abutment surface 88 for preventing damage to the spring 70.

By making the housing 34 of a substantially increased length, the hitching tongue 30 may move upwardly a greater distance at its forward end thereby exerting a greater downward force on the rear wheels 12 of the tractor 11.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A traction booster comprising a flat base plate having means thereon for connecting the plate to the tow bar of a towing vehicle, an elongated housing having an enclosed chamber therein, said housing being connected at its lower end to said base plate and extending upwardly and rearwardly therefrom, said housing having a rear wall with a longitudinal slot formed in its central portion, a single pair of transversely spaced rollers in said chamber, a tongue extending forwardly through said slot into said chamber, means journalling said rollers on opposite sides of said tongue whereby said rollers are adapted to roll on the inner side surfaces of said rear wall, a compression spring in said chamber extending longitudinally thereof between the top of said housing and an upper surface of said tongue, a movable abutment at the upper end of said chamber between said spring and said top, adjustable means between said movable abutment and said top for selectively adjusting the compression of said spring.

2. A traction device as defined in claim 1 wherein said spring is a coil spring, the lower end of said spring and the surface of said tongue contacted by said spring lying in a plane normal to the longitudinal axis of said housing whereby the spring urges said tongue to a horizontal position, said pair of rollers comprising the only means connecting said tongue to said housing.

3. A traction booster as defined in claim 2 wherein said adjustable means includes a stud threaded through said top and having its lower end contacting said abutment.

References Cited in the file of this patent

UNITED STATES PATENTS

| | | |
|---|---|---|
| 1,940,061 | Paul | Dec. 19, 1933 |
| 2,959,427 | Keese | Nov. 8, 1960 |